US006255648B1

(12) United States Patent
Littlejohn et al.

(10) Patent No.: US 6,255,648 B1
(45) Date of Patent: Jul. 3, 2001

(54) PROGRAMMED ELECTRON FLUX

(75) Inventors: Duane P. Littlejohn, Manlius; Robert W. Arnold, Johnson City, both of NY (US)

(73) Assignee: Applied Automation, Inc., Bartlesville, OK (US)

( * ) Notice: Subject to any disclaimer, the term of this patent is extended or adjusted under 35 U.S.C. 154(b) by 0 days.

(21) Appl. No.: 09/173,855

(22) Filed: Oct. 16, 1998

(51) Int. Cl.[7] .............................. B01D 59/44; H01J 49/00
(52) U.S. Cl. .............................................. 250/286; 250/427
(58) Field of Search ..................................... 250/427, 286, 250/281

(56) References Cited

U.S. PATENT DOCUMENTS 2,544,716 * 3/1951 Nier ..................................... 250/427
3,247,373 * 4/1966 Herzog ................................. 250/427
3,937,955 2/1976 Comisarow et al. ................ 250/283
4,808,820 * 2/1989 Blau ..................................... 250/427
5,313,061 5/1994 Drew et al. .......................... 250/281

* cited by examiner

*Primary Examiner*—Bruce C. Anderson

(57) ABSTRACT

A quantity of electrons that will be used in the ionization event in an FTICR MS is preprogrammed. When the number of electrons produced reaches that number, the electron beam is turned off. This approach assures that the same number of electrons are used for every measurement and eliminates the variations due to fundamental characteristics of the electron sourcere and the variations in temperature due to changing ambient conditions.

12 Claims, 2 Drawing Sheets

PROGRAMMED ELECTRON FLUX

FIELD OF THE INVENTION

This invention relates to a mass spectrometer (MS) which uses the Fourier transform ion cyclotron resonance (FTICR) technique to determine the mass of ions and more particularly to the control of the number of electrons generated during the ionization process to ensure that the same number of electrons are used for each measurement.

DESCRIPTION OF THE PRIOR ART

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength:

$$\omega = qB/m \qquad \text{Eq. 1}$$

where:

$\omega$=angular frequency (radians/second)

q=ion charge (coulombs)

B=magnetic field strength (tesla)

m=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. These trapping electrodes are maintained at a potential that is of the same sign as the charge of the ions and of sufficient magnitude to effect axial confinement of the ions between the electrode pair.

The trapped ions are then exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12*a* and 12*b*; excite electrodes 12*c* and 12*d*; and detect electrodes 12*e* and 12*f*.

As the coherent cyclotron motion within the cell causes each isomass bundle of ions to alternately approach and recede from a detection electrode 12*e*, 12*f*, the image charge on the detection electrode correspondingly increases and decreases. If the detection electrodes 12*e*, 12*f* are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14*a* evacuated by an appropriate pumping device 14*b*. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

Pumping device 14*b* may be an ion pump which is an integral part of the vacuum chamber 14*a*. Such an ion pump then uses the same magnetic field from magnet structure 16 as is used by the trapped ion cell 12. An advantage of using an integral ion pump for pumping device 14*b* is that the integral ion pump eliminates the need for vacuum flanges that add significantly to the volume of gas that must be pumped and to the weight and cost of the FTICR MS. One example of a mass spectrometer having an integral ion pump is described in U.S. Pat. No. 5,313,061.

The sample to be analyzed is admitted to the vacuum chamber 14*a* by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14*a* by any one of many different techniques, and then injected along the magnetic field axis into the chamber 14*a* and trapped ion cell 12.

The various electronic circuits necessary to effect the trapped ion cell events described above are contained within an electronics package 22 which is controlled by a computer based data system 24. This data system 24 is also employed to perform reduction, manipulation, display, and communication of the acquired signal data.

In a FTICR MS, a suitable electron source produces the electrons used for ionizing the sample molecules for measurement. The suitable electron source may for example be a Rhenium filament that is heated to about 2000 degrees Celsius. The electron flux for a given period of time determines the number of sample ions made in the ionization period. If the electron source is a filament the designers usually depend on controlling the current used to heat the filament to control the number of electrons produced per unit time. Time is then controlled precisely. This approach does not take into account the small variations in electron flux for a fixed filament current and therefore will not provide the highest level of control.

It is desirable to use the FTICR MS as an unattended very stable quantitative monitor of process streams. In such applications it is very important to repeat the measurements as precisely as possible so that variations in measured signal strength can be attributed only to the change in component concentration and not systematic variations. As was described above, where the electron source is a filament the control of time approach for the generation of electron flux does not take into account the small variations in electron flux for a fixed filament current. The control approaches currently used with other electron sources also do not take into account the variations due to the fundamental characteristics of the electron source. Therefore, the prior art control approaches cannot be used where the FTICR MS is to be used as an unattended monitor of process streams.

SUMMARY OF THE INVENTION

The present invention is a mass spectrometer that includes an electron source and an electron collector opposite the electron source. The mass spectrometer also includes a power source that has an output signal with an amplitude representative of the predetermined total number of electrons to be produced by the electron source during an ionization event in the mass spectrometer. The mass spectrometer further includes a circuit connected to the electron collector for determining when the electron source has produced the predetermined total number of electrons and generates a signal representative thereof.

DESCRIPTION OF THE PREFERRED EMBODIMENT(s)

Figure 1:
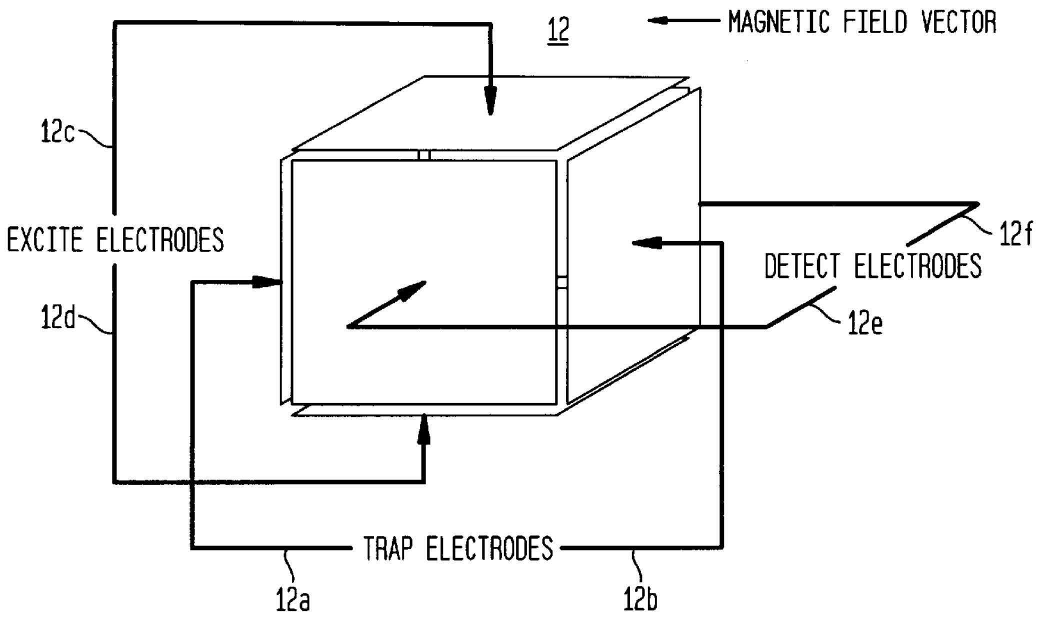
FIG. 1 shows a simplified diagram for a trapped ion cell.
Figure 2:
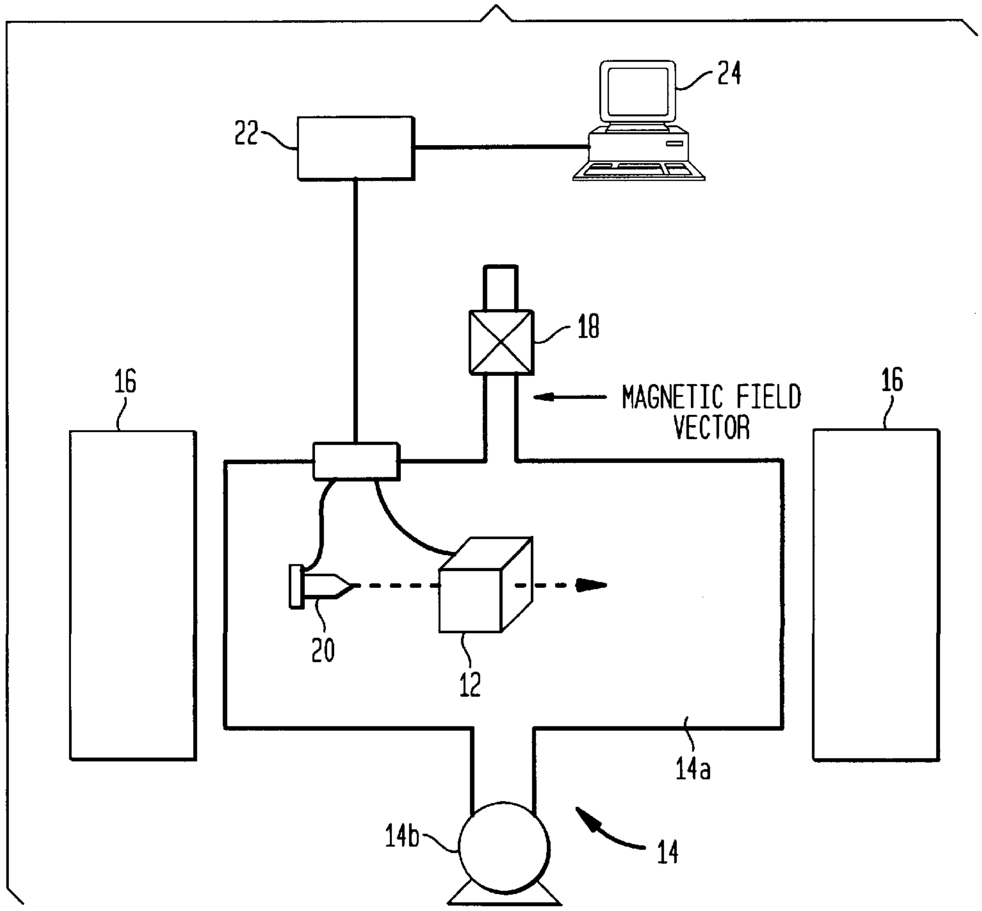
FIG. 2 shows a block diagram of a typical FTICR MS.
Figure 3:
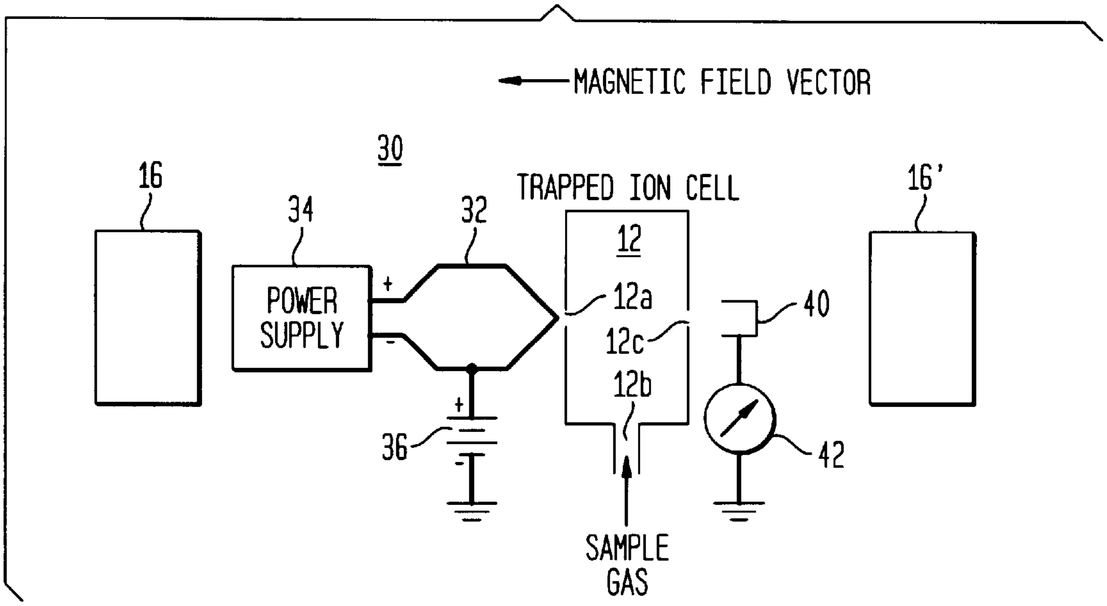
FIG. 3 shows a simplified diagram of a circuit that is used to produce the electrons that are used in the ionizer of the FTICR MS.

Referring now to FIG. 3, there is shown a simplified diagram of a circuit 30 that is used to produce the electrons which are used in ionize 20 of FIG. 2. Circuit 30 includes an electron source 32, shown in FIG. 3 as a filament, that is connected to a supply 34 that provides the power for heating the filament to incandescence. The electron source 32 is also connected to a source 36 of negative potential. The electron source 32 is placed opposite an opening 12*a* in trapped ion cell 12 of FIG. 2. The cell has another opening 12*b* through which the gas sample to be ionized enters the cell and an opening 12*c* which is opposite opening 12*a* and adjacent an external collector 40. The collector 40 is connected through an ammeter 42 to ground potential. The accelerated electrons enter cell 12 through opening 12*a* and exit the cell through opening 12*c*. Magnet 16 of FTICR MS 10 functions to constrain the electrons and increase the path length as the electrons travel a helical path between electron source 32 and collector 40.

Figure 4:
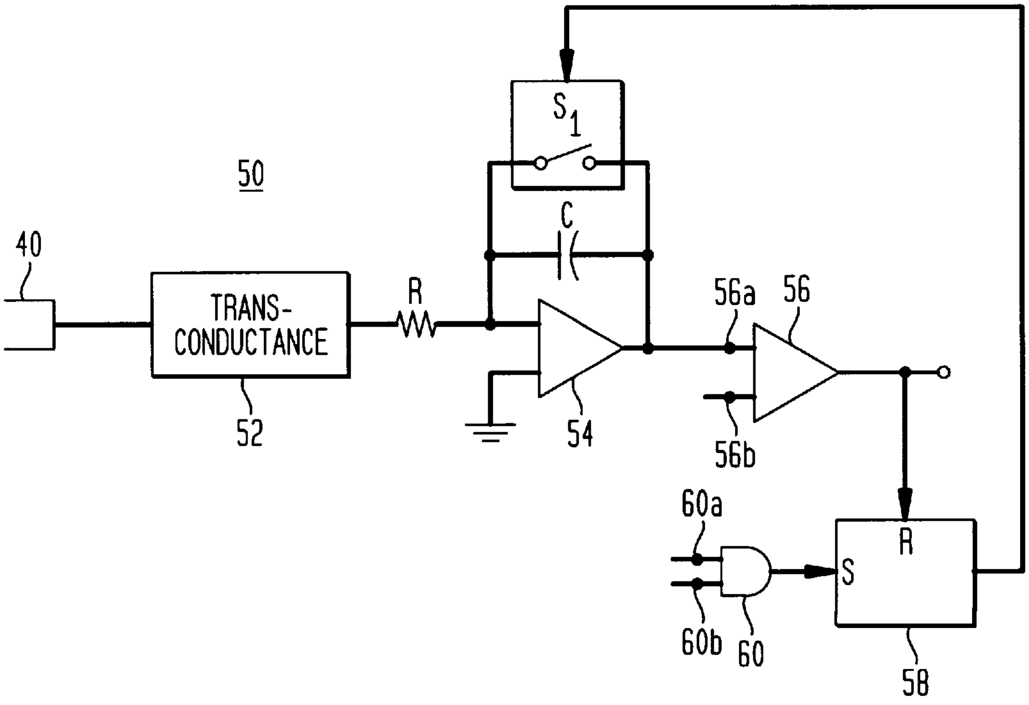
FIG. 4 shows a circuit which is used to determine when the filament of the FTICR MS has produced a predetermined number of electrons and upon that occurrence provide a signal that switches off the electron flow through the FTICR MS analyzer cell.

Referring now to FIG. 4, there is shown a circuit 50 which in accordance with the present invention is used to determine when electron source 32 has produced a predetermined number of electrons and upon that occurrence provide a signal that turns off the electron source. The current at collector 40 that results from the flow of electrons is very close to a perfect current source. That current is converted to a voltage by transconductance circuit 52. The output of circuit 52 is connected by a resistor R to one input of operational amplifier 54. The other input of amplifier 54 is connected to ground. A capacitor C is connected between the output of amplifier 54 and the input to which the output of circuit 52 is connected. A switch S1 is connected across the capacitor.

The output of amplifier 54 is connected to one input 56*a* of a comparator 56. The other input 56*b* to the comparator 56 is a voltage whose amplitude can be selected by a user of the FTICR MS. The selected amplitude represents the predetermined number of electrons that the user desires that filament 32 produce before the electron source is turned off. The output of comparator 56 is connected to the reset input R of a latch 58. The output of latch 58 provides a signal that closes switch S1 when the latch is reset.

The set input S of the latch 58 is connected to receive the output of two input AND gate 60. Input 60*a* of gate 60 receives a signal that when it becomes high indicates that the electron source 32 is to be turned on. Input 60*b* of gate 60 receives a signal that when it is high indicates that the FTICR MS 10 is using the functionality of circuit 50. If FTICR MS is using that functionality then when input 60*a* goes high indicating that the electron source 32 is about to be turned on, the output of gate 60 becomes high to set latch 58. When latch 58 sets its output signal opens switch S1.

As the number of electrons produced by the electron source 32 increases the voltage at the output of amplifier 54 increases as does the voltage at input 56*a* of comparator 56. When the voltage at input 56*a* of comparator 56 increases to the pre-selected amplitude of the voltage at input 56*b* the output of the comparator becomes high to thereby reset the latch 58. The high output of comparator 56 is also used by the FTICR MS to turn off the electron source to thereby terminate the production of electrons. When latch 58 resets its output changes state and closes switch S1. The closing of the switch discharges capacitor C.

In one embodiment for circuit 50, a NPO capacitor was used for capacitor C. As is well known a NPO capacitor has very good temperature stability. In that same embodiment a precision operational amplifier such as the LT 1055 amplifier available from Linear Technology Corporation of Milpitas, Calif. was used for amplifier 54. Equivalent precision operational amplifiers available from other manufacturers can also be used for amplifier 54.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A mass spectrometer comprising:

(a). a FTICR mass spectrometer with an ionization region;

(b). an electron source;

(c). an electron collector opposite said electron source;

(d). a power source having an output signal with an amplitude representative of the predetermined total number of electrons to be produced by said electron source during an ionization event in said mass spectrometer; and (e). a circuit connected to said electron collector for determining when said electron source has produced said predetermined total number of electrons and generating a signal representative thereof for ensuring that a same number of electrons are used in each measurement of said mass spectrometer.

2. The mass spectrometer of claim 1 wherein said signal representative of when said electron source has produced said predetermined total number of electrons is used in said mass spectrometer to turn off said electron source.

3. The mass spectrometer of claim 1 wherein said circuit comprises:

i. an integrator connected to receive a voltage that is representative of the current produced during said ionization event at said electron collector and provide an output voltage;

ii. a comparator for comparing the amplitude of said integrator output voltage to said power source output signal amplitude for generating said signal which is representative of when said electron source has produced said predetermined number of electrons.

4. The mass spectrometer of claim 3 wherein said signal representative of when said electron source has produced said predetermined total number of electrons is used in said mass spectrometer to turn off said electron source.

5. The mass spectrometer of claim 3 wherein said predetermined total number of electrons is selectable.

6. The mass spectrometer of claim 3 wherein said integrator is an operational amplifier.

7. The mall spectrometer of claim 6 wherein said operational amplifier is a precision operational amplifier.

8. The mass spectrometer of claim 7 wherein said operational amplifier has a capacitor of the NPO type connected between the operational amplifier input and output.

9. The mass spectrometer of claim 1 wherein said predetermined total number of electrons is selectable.

10. The mass spectrometer of claim 1 further comprising an ionization chamber between said electron source and said electron collector.

11. The mass spectrometer of claim 10 further comprising an ion pump integral with said ionization chamber.

12. The mass spectrometer of claim 1 wherein said electron source is a wire filament.

* * * * *